US012718551B2

(12) United States Patent
Rangavajhala et al.

(10) Patent No.: US 12,718,551 B2
(45) Date of Patent: Aug. 25, 2026

(54) SYSTEMS AND METHODS FOR TUNING LIGHT SOURCES FOR USE WITH OBJECT DETECTION ALGORITHMS

(71) Applicant: SIGNIFY HOLDING B.V., Eindhoven (NL)

(72) Inventors: Sirisha Rangavajhala, Eindhoven (NL); Abhishek Murthy, Eindhoven (NL); Olaitan Philip Olaleye, Eindhoven (NL); Kalpathy Sivaraman Sivaraman, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/272,296

(22) PCT Filed: Aug. 23, 2019

(86) PCT No.: PCT/EP2019/072542

§ 371 (c)(1),
(2) Date: Feb. 27, 2021

(87) PCT Pub. No.: WO2020/043604

PCT Pub. Date: Mar. 5, 2020

(65) Prior Publication Data

US 2021/0216802 A1 Jul. 15, 2021

Related U.S. Application Data

(60) Provisional application No. 62/723,143, filed on Aug. 27, 2018.

(30) Foreign Application Priority Data

Sep. 12, 2018 (EP) .................................... 18193977

(51) Int. Cl.
*G06V 10/141* (2022.01)
*G06V 10/98* (2022.01)
*H04N 23/56* (2023.01)

(52) U.S. Cl.
CPC .......... *G06V 10/993* (2022.01); *G06V 10/141* (2022.01); *H04N 23/56* (2023.01)

(58) Field of Classification Search
CPC ............. G06V 10/141; G06V 10/1431; G06V 10/993; G06V 10/145; G06K 9/00; H04N 23/56; H04N 23/74
See application file for complete search history.

(56) References Cited

U.S. PATENT DOCUMENTS 5,912,986 A * 6/1999 Shustorovich ....... G06V 30/146 382/156
8,786,198 B2 7/2014 De Groot
(Continued)

FOREIGN PATENT DOCUMENTS

CA 2955837 A1 * 3/2008 ............. G06F 16/50
JP 2008264430 A 11/2008
(Continued)

OTHER PUBLICATIONS

S. Y. Chen, J. Zhang, H. Zhang, W. Wang and Y. F. Li, "Active Illumination for Robot Vision," Proceedings 2007 IEEE International Conference on Robotics and Automation, 2007, pp. 411-416, doi: 10.1109/ROBOT.2007.363821. (Year: 2007).*
(Continued)

*Primary Examiner* — Michael Robert Cammarata

(57) ABSTRACT

An object detection system (100) is disclosed herein. The system 100 includes a lighting system (50) to illuminate an object and at least one selectable light output quality, at least one image sensor (70) positioned to obtain an image of an object, and at least one processor (10) coupled to the image sensor (70) to receive the image of the object. The processor
(Continued)

(10) includes a monitoring engine (30) configured to determine if the image has an image quality metric (IQM) value or an expected confidence value corresponding to the IQM value that meets a predetermined threshold and a light settings calculation module (40) configured to select the light output qualities of the lighting system (50) to improve the IQM value or the expected confidence value corresponding to the IQM value to meet the predetermined threshold.

9 Claims, 6 Drawing Sheets

(56) References Cited

U.S. PATENT DOCUMENTS

| | | | | |
|---|---|---|---|---|
| 9,285,893 | B2 * | 3/2016 | Holz | G06F 3/0304 |
| 10,728,967 | B1 * | 7/2020 | Treadway | F21S 4/28 |
| 2004/0143380 | A1 | 7/2004 | Stam et al. | |
| 2008/0260242 | A1 * | 10/2008 | MacKinnon | G06V 10/141 382/162 |
| 2008/0297054 | A1 * | 12/2008 | Speier | H05B 45/22 315/294 |
| 2010/0207544 | A1 * | 8/2010 | Man | H05B 45/28 315/294 |
| 2012/0262562 | A1 * | 10/2012 | Fukutake | G02B 21/14 348/79 |
| 2015/0012226 | A1 * | 1/2015 | Skaff | G06K 9/00 702/22 |
| 2015/0035440 | A1 * | 2/2015 | Spero | B60Q 1/1423 315/153 |
| 2016/0119523 | A1 * | 4/2016 | Egger | G06V 10/143 348/370 |
| 2018/0068160 | A1 * | 3/2018 | Wu | G06K 9/00 |
| 2018/0109713 | A1 * | 4/2018 | Hennings | H05B 47/105 |
| 2018/0139818 | A1 * | 5/2018 | Coombes | H05B 45/58 |
| 2019/0014638 | A1 * | 1/2019 | Weaver | H04N 5/232 |
| 2019/0098724 | A1 * | 3/2019 | Zhao | H05B 47/125 |
| 2019/0130579 | A1 * | 5/2019 | Heo | G02B 27/0093 |
| 2019/0152379 | A1 * | 5/2019 | Biswal | B60Q 1/085 |
| 2019/0268517 | A1 * | 8/2019 | Hwang | H04N 23/56 |
| 2020/0151692 | A1 * | 5/2020 | Gao | G06Q 20/201 |
| 2020/0175247 | A1 * | 6/2020 | Weaver | H04N 5/2354 |
| 2021/0166000 | A1 * | 6/2021 | Maeda | G06V 40/166 |

FOREIGN PATENT DOCUMENTS

| | | | | | |
|---|---|---|---|---|---|
| JP | 4372321 | B2 * | 11/2009 | G01N 21/8806 |
| JP | 2017535043 | A * | 11/2017 | |
| WO | WO-2015198013 | A1 * | 12/2015 | G06K 9/00221 |
| WO | 2018087941 | A1 | 5/2018 | |

OTHER PUBLICATIONS

R. Gruna and J. Beyerer, “Feature-specific illumination patterns for automated visual inspection,” 2012 IEEE International Instrumentation and Measurement Technology Conference Proceedings, 2012, pp. 360-365, doi: 10.1109/12MTC.2012.6229465. (Year: 2012).*

Cusano, Claudio, Paolo Napoletano, and Raimondo Schettini. “Evaluating color texture descriptors under large variations of controlled lighting conditions.” JOSA A 33.1 (2016): 17-30. (Year: 2016).*

Liu H, Zhou Q, Yang J, Jiang T, Liu Z, Li J. Intelligent Luminance Control of Lighting Systems Based on Imaging Sensor Feedback. Sensors (Basel). 2017;17(2):321. Published Feb. 9, 2017. doi:10.3390/s17020321 (Year: 2017).*

O. Borzenko, Y. Lesperance and M. Jenkin, “Controlling camera and lights for intelligent image acquisition and merging,” The 2nd Canadian Conference on Computer and Robot Vision (CRV’05), 2005, pp. 602-609, doi: 10.1109/CRV.2005.29. (Year: 2005).*

S. Y. Chen, J. Zhang, H. Zhang, N. M. Kwok and Y. F. Li, “Intelligent Lighting Control for Vision-Based Robotic Manipulation,” in IEEE Transactions on Industrial Electronics, vol. 59, No. 8, pp. 3254-3263, Aug. 2012, doi: 10.1109/TIE.2011.2146212. (Year: 2012).*

Chew, V. Kalavally, C. P. Tan and J. Parkkinen, “A Spectrally Tunable Smart LED Lighting System With Closed-Loop Control,” in IEEE Sensors Journal, vol. 16, No. 11, pp. 4452-4459, Jun. 1, 2016, doi: 10.1109/JSEN.2016.2542265. (Year: 2016).*

* cited by examiner

| | | Object property 1 (e.g. color) | | | Object property 2 (e.g. shape) | | | Object property 3 (e.g. texture) | |
|---|---|---|---|---|---|---|---|---|---|
| | | Dark | Light | Medium | Cylindrical | Cuboidal | Spherical | Smooth | Rough |
| IQM 1 (e.g. brightness) | Low | | | | | | | | |
| | Medium | | | | | | | | |
| | High | | | | | | | | |
| IQM 2 (e.g. contrast) | Low | | | | | | | | |
| | Medium | | | | | | | | |
| | High | | | | | | | | |
| IQM 3 (e.g. uniformity) | Low | | | | | | | | |
| | Medium | | | | | | | | |
| | High | | | | | | | | |

FIG. 3

| | | Object property 1 (e.g. color) | | | Object property 2 (e.g. shape) | | | Object property 3 (e.g. texture) | |
|---|---|---|---|---|---|---|---|---|---|
| | | Dark | Light | Medium | Cylindrical | Cuboidal | Spherical | Smooth | Rough |
| Intensity | Luminaire 1 | | | | | | | | |
| | Lumianire 2 | | | | | | | | |
| | | | | | | | | | |
| Spectral distribution | Luminaire 1 | | | | | | | | |
| | Luminaire 2 | | | | | | | | |
| | | | | | | | | | |

FIG. 4

SYSTEMS AND METHODS FOR TUNING LIGHT SOURCES FOR USE WITH OBJECT DETECTION ALGORITHMS

CROSS-REFERENCE TO PRIOR APPLICATIONS

This application is the U.S. National Phase application under 35 U.S.C. § 371 of International Application No. PCT/EP2019/072542, filed on Aug. 23, 2019, which claims the benefits of European Patent Application No. 18193977.8, filed on Sep. 12, 2018 and U.S. Patent Application No. 62/723,143, filed on Aug. 27, 2018. These applications are hereby incorporated by reference herein.

FIELD OF THE INVENTION

The present disclosure is directed generally to systems and methods for tuning light sources to improve deep learning-based object detection.

BACKGROUND

State-of-the-art object detection algorithms involve deep learning, such as, for example, Convolutional Neural Networks (CNN). Two particular examples of CNN architectures are VGG16 and Residual Network (ResNet). These architectures are trained to classify an object-in-question as one of a plurality of objects that are present in a predefined database (such as Imagenet) of possible objects. However, object detection using deep learning algorithms has decreased performance when lighting conditions are suboptimal. Indeed, object detection may fail when an object is illuminated with poor lighting.

Accordingly, there is a continued need in the art for systems and methods that improve deep learning-based object detection.

SUMMARY OF THE INVENTION

The present disclosure is directed to inventive systems and methods for tuning light sources to improve deep learning-based object detection. In particular, embodiments of the present invention are directed to improving illumination conditions of an object for optimal deep learning-based object detection. Various embodiments and implementations herein are directed to an object detection system including a learning module, a monitoring engine, and a light settings calculation module.

Generally, in one aspect, an object detection system is provided. The object detection system includes: (i) a lighting system to illuminate an object, the lighting system having at least one selectable light output quality; (ii) at least one image sensor positioned to obtain an image of an object; and (iii) at least one processor coupled to the image sensor to receive the image of the object. The at least one processor includes a monitoring engine configured to determine if the image has an image quality metric (IQM) value or an expected confidence value corresponding to the IQM value that meets a predetermined threshold and a light settings calculation module configured to select the light output qualities of the lighting system to improve the IQM value or the expected confidence value corresponding to the IQM value to meet the predetermined threshold.

According to an embodiment, the system further includes a training module configured to learn confidence values corresponding to selected object properties and image metrics, and wherein the monitoring engine is further configured to obtain a confidence value from the training module for the image.

According to an embodiment, the monitoring engine is further configured to calculate an image quality metric (IQM) value.

According to an embodiment, the at least one selectable light output quality is a light intensity. According to a further embodiment, the at least one selectable light output quality includes light intensity and relative intensities of wavelengths of light.

According to an embodiment, the training module includes a first data structure including confidence values for an array of properties of a plurality of objects and image qualities metric (IQM) values.

According to an embodiment, the array of properties includes a plurality of colors of the plurality of objects. According to further embodiment, the plurality of colors is uniformly sampled from CIE XYZ color space.

According to an embodiment, the at least one image sensor is configured to obtain a live feed of images of the object, and the image of the object is an image from the live feed of images.

According to an embodiment, the light settings calculation module is configured to select the light output qualities of the lighting system using a plurality of if-then rules.

According to an embodiment, the light settings calculation module is configured to add or amend rules over a period of time.

According to an embodiment, the light settings calculation module includes a data structure including image quality metric (IQM) values for object properties and light settings, the IQM values corresponding to maximum confidence values for a plurality of objects.

According to an embodiment, the light settings calculation module includes a second data structure including IQM values for object properties and light settings corresponding to maximum confidence values for a plurality of objects, and the light settings calculation module is further configured to populate the second data structure by obtaining data from the first data structure.

According to an embodiment, the light settings calculation module includes a multichannel color mixing algorithm to compute duty cycles for each color channel of each luminaire to select the relative intensities of wavelengths of light.

Generally, in another aspect a method for tuning light sources to enhance object detection is provided. The method includes: (i) acquiring an image of the object illuminated by a light source; (ii) calculating at least one image quality metric (IQM) value for the image; (iii) determining if the at least one IQM or an expected confidence value corresponding to the IQM value meets a predetermined threshold; and (iv) if the at least one IQM value or the expected confidence value does not meet the predetermined confidence value threshold, adjusting the light output from the light source according to a database of rules.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the present disclosure.

FIG. 3 illustrates an example of a performance look-up-table according to aspects of the present disclosure;

FIG. 4 illustrates an example of a light calculation table for use with aspects of the present disclosure;

DETAILED DESCRIPTION OF EMBODIMENTS

The present disclosure describes various embodiments of systems and methods for tuning light sources for use with object detection. More generally, Applicant has recognized and appreciated that it would be beneficial to provide a lighting system having a learning module, a monitoring engine, and a light settings calculation module. Exemplary goals of utilization of certain embodiments of the present disclosure are to improve image quality to accurately, quickly, and more confidently identify objects by improving lighting conditions.

Figure 1:
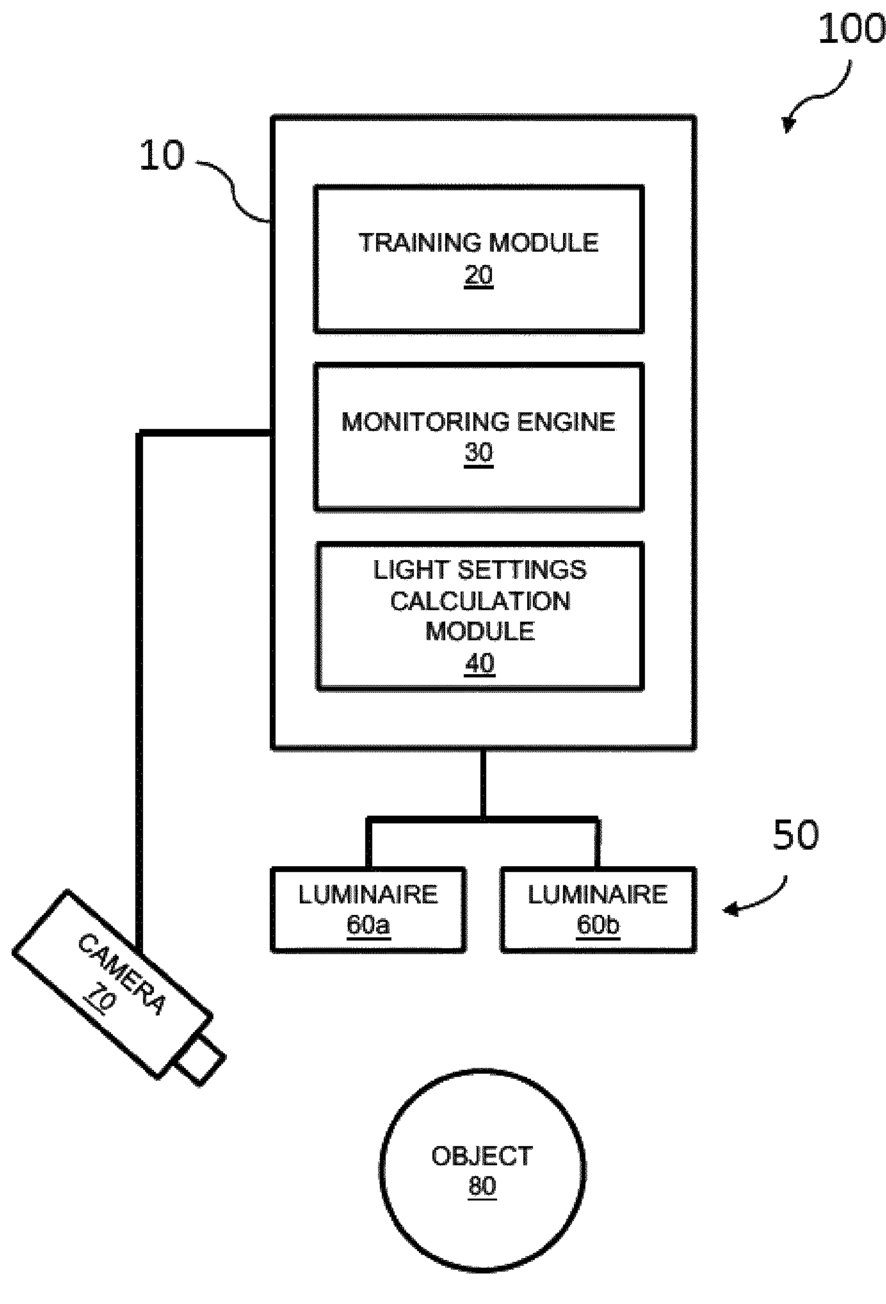
FIG. 1 is a block diagram schematically illustrating a deep learning-based object detection system including a light system with light source controls to improve deep learning-based object detection.

Referring to FIG. 1, a system 100 operated to improve deep learning-based object detection is illustrated. The object detection system 100 includes a lighting system 50 having one or more luminaires 60*a*, 60*b* to illuminate an object 80, and an image sensor 70 positioned to obtain images of object 80 when placed in the field of illumination of the lighting system 60. As described in greater detail below, processor 10 may include a training module 20 a monitoring engine 30, and a light source settings calculation module 40. The processor 10 may be coupled to image sensor 70 to receive the images of an object and may be further coupled to lighting system 50 to control a light output of lighting system 50.

Processor 10 may take any suitable form, such as a microcontroller (or multiple microcontrollers), circuitry, a single processor (or multiple processors) configured to execute software instructions. Memory associated with the processor (not shown) may take any suitable form or forms, including a volatile memory, such as random access memory (RAM), or non-volatile memory such as read only memory (ROM), flash memory, a hard disk drive (HDD), a solid state drive (SSD), or other data storage media. The memory may be used by processor 10 for temporary storage of data during its operation. Data and software, such as the algorithms or software necessary to analyze the data collected by the image sensor 70, an operating system, firmware, or other application, may be installed in the memory. A deep learning mechanism implemented by the processor or memory may be or may include an artificial neural network, a deep learning engine, or any other machine learning algorithm.

Although system 100 is illustrated with one processor to control lighting system 50, it is to be understood that a system may, alternatively, have multiple processors to achieve such functionality. For example a first processor may control the camera and obtain images from the camera and a second processor may control the lighting and contain the training module 20, the monitoring engine 30, and/or the light source settings calculation module 40. The system 100 may also include a remote or centralized backend computer (not shown), e.g., one or more servers, databases, network equipment, or other computing hardware or devices having sufficient computing resources for performing calculations, making determinations, and storing data for the system 100 as discussed herein. The backend computer may include one or more processors, memory, and/or communication modules and may implemented via cloud computing. In one particular embodiment (not shown), the training module 20 is stored in a database, the monitoring engine 30 is configured on a first processor, and the light source settings calculation engine 40 is configured on a second processor.

Lighting system 50 may be of any suitable configuration allowing selectability of light-output qualities. Such light-output qualities may include, for example, a spectrum of light including the presence or absence of one or more selected wavelengths or bands of wavelengths, a relative intensity of one or more wavelengths or bands of wavelengths in the spectrum, and aggregate light intensity. The lighting system 50 may be operated to control luminaire CRT (e.g., red, green, blue) outputs or correlated color temperature (CCT). The lighting system 50 may provide for multichannel color mixing. The luminaire may include fluorescent, incandescent, halogen, neon or LED light sources or a combination thereof. For example, the lighting system 50 may comprise one or more color-tunable, multichannel LED luminaires.

Image sensor 70 may be of any suitable configuration to detect light within a spectrum of interest and light intensity range of interest. For example, image sensor 70 may be a camera and may include a CMOS or CCD-based area array detector. Filtering of light from object 80 may be provided by the detector itself or with suitable spectral filtering.

The training module 30 may be configured to allow the system 100 to dynamically learn ideal lighting conditions for various object colors using input data and generate a confidence value corresponding to selected environmental (e.g., lighting) conditions. The training module 30 may be configured to create (e.g., populate or map) a data structure (e.g., look-up table) including, for example, (1) image quality metrics (IQMs) of the frame (e.g. uniformity, contrast, intensity), (2) one or more object properties (e.g., color, shape, texture), and (3) softmax values of an object detection algorithm used by the system 100. An example of such a data structure is described, below, with reference to FIG. 3. Although reference is made, herein, to calculation of and use of "softmax scores", it is to be appreciated that softmax is only one example of a confidence measure of a detected object and other measures may be used.

Creation of the data structure can include recording of light source settings (e.g. in terms of CRT, CCT, intensity) and corresponding confidence scores for objects of given colors that are expected to be present in the illuminated environment. Alternatively, creation of the data structure can be more generic, for example, objects of colors uniformly sampled from CIE XYZ color space may be used to create the data structure.

The monitoring engine 30 may use the image sensor 70 to capture still or live feed images and/or may use images from another camera (not shown) to perform image analysis. In one embodiment, the monitoring engine 30 uses a deep learning algorithm to determine if image parameters indicative of object detection are determined to be unsatisfactory by comparing to a predetermined confidence value threshold. The monitoring engine 30 triggers a corrective lighting action if parameters indicative of object detection are determined to not meet a predetermined threshold by engaging light settings calculations module 40. For example, the parameters used by the monitoring engine 30 to determine if an image is satisfactory or unsatisfactory could be, for example, IQMs (e.g., measure of contrast, intensity or uniformity of frame containing an image of object O) or softmax values resulting from processing of the image using a deep learning mechanism.

The light settings calculation module 40 is configured to adjust the lighting system to achieve acceptable image quality metrics or to correspond to the best softmax value for an identified object. As described in greater detail below, in some embodiments, the light settings calculation module 40 interacts with training module 20 to learn (e.g., populate the light calculation table with) the image quality metrics needed for an object having certain characteristics (e.g., color, shape, texture) to maximize the softmax value. In some embodiments, the light settings calculation module 40 is programed to perform space-geometrical calculations to identify which luminaires influence the image quality metrics of the object given the relative locations of the luminaires and the object's bounding box.

Processes of detecting objects using sensors, such as an image sensor, are generally known. For example, the process of detecting objects in images using deep learning mechanisms will be generally known to those of ordinary skill in the art. Artificial neural networks, such as Convolutional Neural Networks (CNNs), are examples of deep learning models used for object detection. A CNN commonly includes a series of convolution operations performed on a pre-defined subset of pixels (or kernel) across the image. The dimensions of the kernel are changed at every step. Other operations, like max-pooling and dropouts may be used by the CNN. Each layer typically performs a nonlinear transformation on the output of the convolution and passes the outputs to the next layer. The models need to be trained in a supervised fashion by providing known (labelled) examples of objects to the CNN. Standard labelled datasets, such as ImageNet, exist and can be used to train the networks on known examples of hundreds of objects. Examples of CNNs trained for object detection include Visual Geometry Group's VGG16 model, Residual Network (ResNet), and Google's GoogleNet, although many others exist and can be alternatively or additionally utilized. Many of these models include a final layer that uses a softmax function to produce confidence values (softmax scores or values), corresponding to the likelihood that the deep learning mechanism has accurately detect an object (i.e., the larger the confidence value for an object, the greater the probability that the object is in the image, and thus accurately detected by the deep learning mechanism). For example, a variance in a selected number of softmax values may be calculated or a ratio of the highest to the second-highest softmax values may be calculated from softmax scores provided by a deep learning algorithm. It is to be appreciated that the softmax function is only one example of a confidence value and that confidence values, probabilities, and/or likelihoods can be produced according to any desired function.

The deep learning mechanisms, particularly, artificial neural networks, may be trained using ImageNet. The performance of the networks can be measured by recording the inferences of each object under each lighting setting. Softmax scores can be calculated corresponding to each object under the different conditions. It is noted that softmax scores, by themselves, do not measure performance and/or confidence of the object detection algorithm. Rather, softmax scores are outputs of any CNN-based object detection algorithm, for example. The variance in the top k softmax values and the ratio of the highest to the second-highest softmax values are two confidence metrics derived from the softmax scores that are output.

Figure 2:
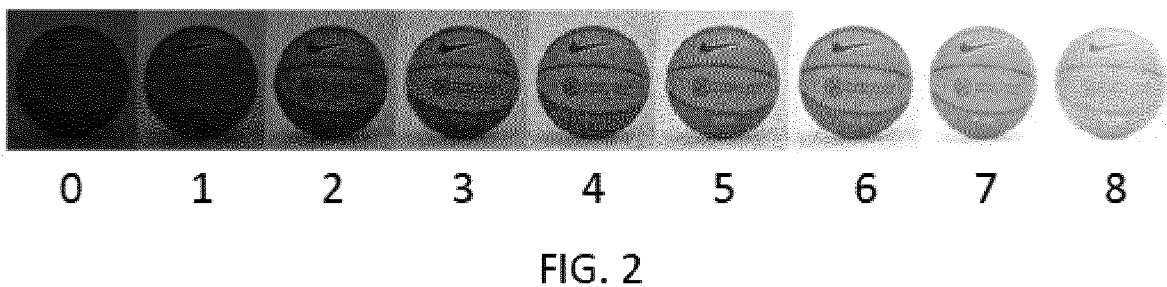
FIG. 2 illustrates one example of an object, namely, a basketball, under nine lighting conditions, i.e. ranging from very dark at condition '0' to overexposed at condition '8'.

In one example, the ResNet model is selected as the deep learning mechanism and provided with images captured of many different objects (vase, basketball, bottle, car, etc.) under different lighting conditions. The confidence value (determined from softmax values, in this example) generated by the deep learning mechanism pertaining to each of the objects is recorded under each of the lighting conditions to observe how well the deep learning mechanism could identify each object under the lighting conditions. FIG. 2 is provided to show one example of an object, namely, a basketball, under the nine lighting conditions used in this experiment, i.e. ranging from very dark at condition '0' to overexposed at condition '8'.

As may be appreciated in view of FIG. 2, the performance of the deep learning mechanism can vary significantly across the lighting conditions. More specifically, softmax scores associated with an object can vary significantly as the lighting conditions are varied. For example, the softmax value for most of the objects is relatively poor under very dark and/or very bright lighting conditions, while some objects are more accurately identified under darker conditions, and other objects are more accurately identified under lighter conditions.

It is also noted that, in contrast to the uniform lighting of the basketball in FIG. 2, non-uniform lighting conditions on objects can be tested (e.g., by adding strong directional lighting on the objects from one or more particular angles only). Non-uniform conditions may be of particular interest because they are often found in many outdoor areas, e.g., where trees, buildings, and other infrastructure create occlusions and make the lighting scene highly complex (e.g., dappled areas of bright direct sun immediately adjacent to heavy shadows). The performance of deep learning mechanisms can vary significantly when identifying objects under different lighting conditions. That is, the probability of deep learning mechanism accurately detecting objects based on the data collected by a camera is influenced by object being detected, the particular image sensor being used and lighting conditions. By selecting lighting parameters using techniques as described herein, object recognition using deep learning mechanisms can be improved.

Operation of system 100 according to aspects of the present disclosure may include two phases: (1) a training phase in which data is gathered into a data structure for subsequent use and (2) an operational phase in which the system is used for object detection. The training phase may occur, in-part or in-whole, before the operational phase; however, data structures generated during the training phase may be modified during the operational phase. Although there are benefits that may arise from using the same apparatus during the training phase and the operational phase, any such apparatus used during the training phase may be the same or different than the apparatus used during the operational phase. It is noted that embodiments of the present disclosure are directed to methods and apparatus used with the training phase (apart from the operational phase), methods and apparatus used with the operational phase (apart from the training phase), and combinations of the methods and apparatus used with the training phase and the operational phase, together.

In one embodiment, the training phase may occur in a lighting environment that is different than the environment in which the operational phase is to occur (i.e., the training may occur offline). In a further embodiment, the training phase may occur, at least in part, in the same lighting environment in which the operational phase is to occur (i.e., the training phase and the operational phase are installation-specific). The training module may create the data structure (e.g., populates data) over time by determining how, for example, object colors and light quality affect object detection. For example, the learning of such a module involves creating a lookup table of (1) the image quality metrics of the frame, such as uniformity, (2) contrast, (3) color of the object, and the corresponding softmax values of the object detection algorithm under selected object/light conditions.

Non-limiting examples of performance look up tables can be appreciated from FIG. 3 particularly with respect to object detection for image-based sensors. For example, in FIG. 3 each row has different object properties (e.g., color, shape and texture). The rows of the table in FIG. 3 represent metrics (IQMs) for a variety of image qualities. More specifically, the entries of the table in FIG. 3 are the softmax-based confidence measures for the given object property and the IQM. Those of ordinary skill in the art will appreciate that FIG. 3 is provided as one example only of a look-up table and readily recognize that other properties could be utilized according to other embodiments.

With reference to FIG. 3, and as described herein, the illustrative table entries in are intended to be filled with performance metrics that indicate the performance of the deep learning mechanism under combinations of object properties and image quality metrics. The performance metrics stored as entries in the table could be a single value generally describing the deep learning mechanism's ability to detect objects under the given conditions, or an array of values. For example, each entry in the table of FIG. 3 could include different values for each a plurality of deep learning mechanisms. It is noted that FIG. 3 is provided as a non-limiting example only. For example, in addition or alternately to confidence values, the system 10 could instead generate and/or store ratios of the confidence values (e.g., maximum softmax value divided by the second-largest softmax value), the variance among the confidence values (e.g., amongst the five largest softmax values).

Learning (e.g., filling in of data in the table of FIG. 3) can be performed for objects of typical colors expected in the scene of interest or it can be conducted for colors uniformly sampled from the CIExy color space, which collectively represents the entire gamut of colors visible for humans. Learning can be performed via experimentation or by simulation.

In some instances, installation-specific learning (including the softmax values for each object/IQM resulting from operation in the space in which operation is to occur) can be used to further adjust the lighting calculations.

Additionally, after the operation phase begins, the training module can be updated as needed based on the learnings gained of the space and light settings over time.

During the operation of the monitoring engine 30, the image sensor 70 may capture a live feed or still images. The processor 10 processes the images of the light feed, for example, to generate IQM values. The processor 10 may be an on-board or a backend cloud processor that computes the key parameters required (e.g., color, shape, texture, location). In some embodiments, the monitoring engine 30 references the look-up table of the learning module 20 to determine an expected softmax value based on IQM or an average of softmax values based on multiple IQMs. The monitoring engine 30 triggers a corrective lighting action if key parameters (e.g., IQM values or softmax values) from the image sensor 70 are unsatisfactory.

In the event the monitoring engine 30 determines that the key parameters of an image or images are unsatisfactory, the monitoring triggers a "corrective" lighting action by engaging the light source settings calculations module.

Upon the trigger of a corrective lighting action, the light settings calculation module 40 analyzes lighting parameters, and computes the light settings for each luminaire 60*a*, 60*b* in the space that are suitable for generating images that are satisfactory.

In some embodiments, the light source settings calculation module can include a set of if-then rules. For example, If object=1 and $IQM_{uniformity}$="bad" and object 1 bounding box=($x_1$,$y_2$), then adjust luminaires to EQUAL (Eqn. 1)

If object=2 and color="brown" and object 1 bounding box=($x_3$,$y_4$), then set CRI of luminaires 2 and 3 to MAX (Eqn. 2)

In some embodiments, the light settings calculation module 40 rules can be learned over time. In some embodiments, light settings calculation module 40 can be provided with an initial set of rules. Additional rules can be a learned over time by adding or amending rules using techniques such as reinforcement learning. The light settings calculation module 40 may, over time, learn appropriate corrective lighting actions for a given set of IQM/object colors, as well as corrective actions for a wide array of additional factors, such as, different times of the day. For example, the light settings calculation module 40 may interact with the training module 20 to learn (e.g., populate the entries of a light calculation table of FIG. 4) the IQM value needed for an object of a given color to appropriately improve or maximize the softmax value. As described below, the light calculation table entries may be populated with IQM values for various object properties and light settings corresponding to maximum softmax values. In some embodiments, each entry may be populated with an array of IQM values with corresponding light settings.

In some embodiments, the light settings calculation module 40 performs space geometrical calculations to infer which luminaires can influence the IQM parameters of the object given the relative locations of the luminaires and the object's bounding box. In such embodiments, the light settings calculation module 40 adjusts the relative intensities of each luminaire 60*a*, 60*b* depending on the position of the object 80 in a frame of an image.

In some embodiments, the light settings calculation engine 40 additionally also identifies an optimal CRI or CCT required for the space illumination. For example, the light settings calculation engine 40 may employ a conventional multichannel color mixing algorithm that computes the duty cycles required for each color channel of each luminaire 60*a*, 60*b* to achieve the optimal spectrum required. It will be appreciated that such a configuration allows relative intensities of wavelengths of light of a luminaire to be selected.

Non-limiting examples of a light control look up table (LUT) can be appreciated from FIG. 4 particularly with respect to object detection for image-based sensors. For example, in FIG. 4 each row has a different object property. Those of ordinary skill in the art will appreciate that FIG. 4 is provided as one example only and will readily recognize that other parameters properties could be utilized according to other embodiments. The columns of the table in FIG. 4 represent illustrative settings on luminaires in a lighting system.

The entries in the table of FIG. 4 are intended to be filled with image quality metrics that indicate the maximum achievable performance under combinations of object properties and lighting settings. For example, as discussed above, the IQMs might include metrics for image quality. Further, each entry may be a single IQM value corresponding to a single type of metric, an array of various IQMs corresponding to various metrics, a single value corresponding to an average of various metrics.

In one example of a light calculation table, the table may be populated with an IQM corresponding to a maximum softmax score and corresponding luminaire settings. The luminaire settings may include intensity values. In some embodiments, spectral settings may also be populated (e.g., for luminaires including multichannel LED sources).

Figure 5:
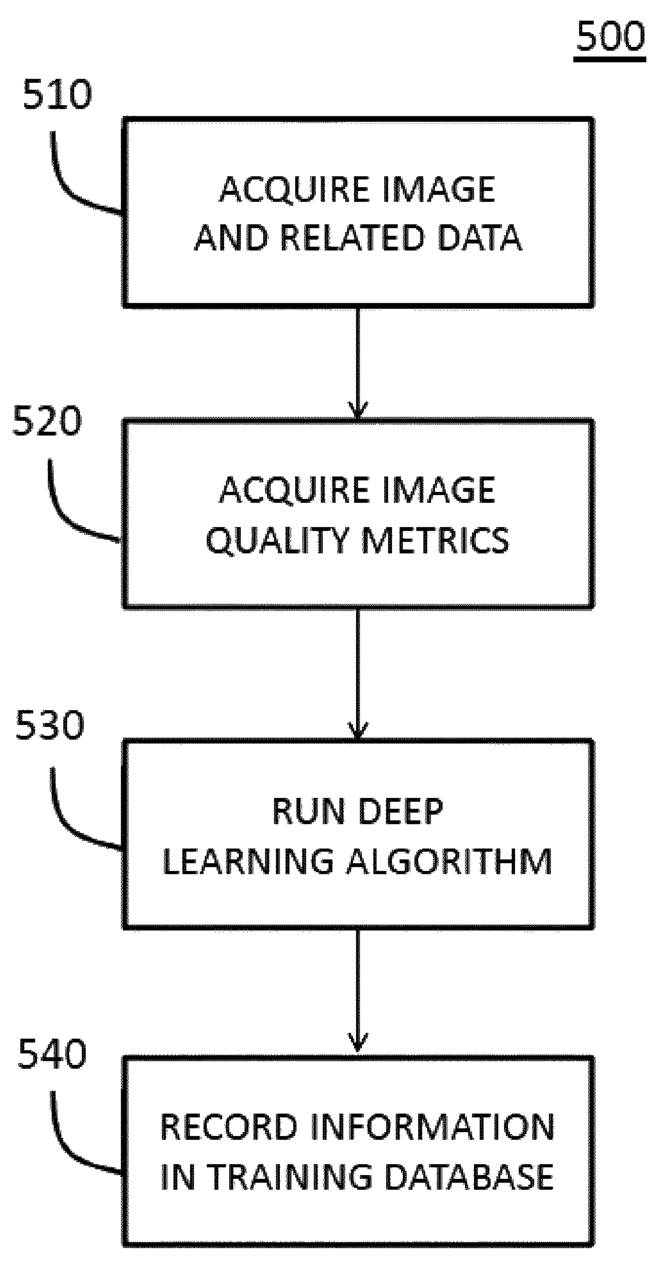
FIG. 5 is a flow chart showing examples of steps in populating a learning database.

FIG. 5 is a flow chart showing examples of steps in populating a training database. At step 510, images are captured by an image sensor (or images are provided in a database), object characteristics (e.g., color, texture shape) are identified or provided, and image sensor settings are recorded. At step 520, image quality metrics are computed or provided. At step 530, the images are run through the deep learning algorithm to determine a confidence score (e.g., softmax score). At step 540, the results are recorded in the training database.

Figure 6:
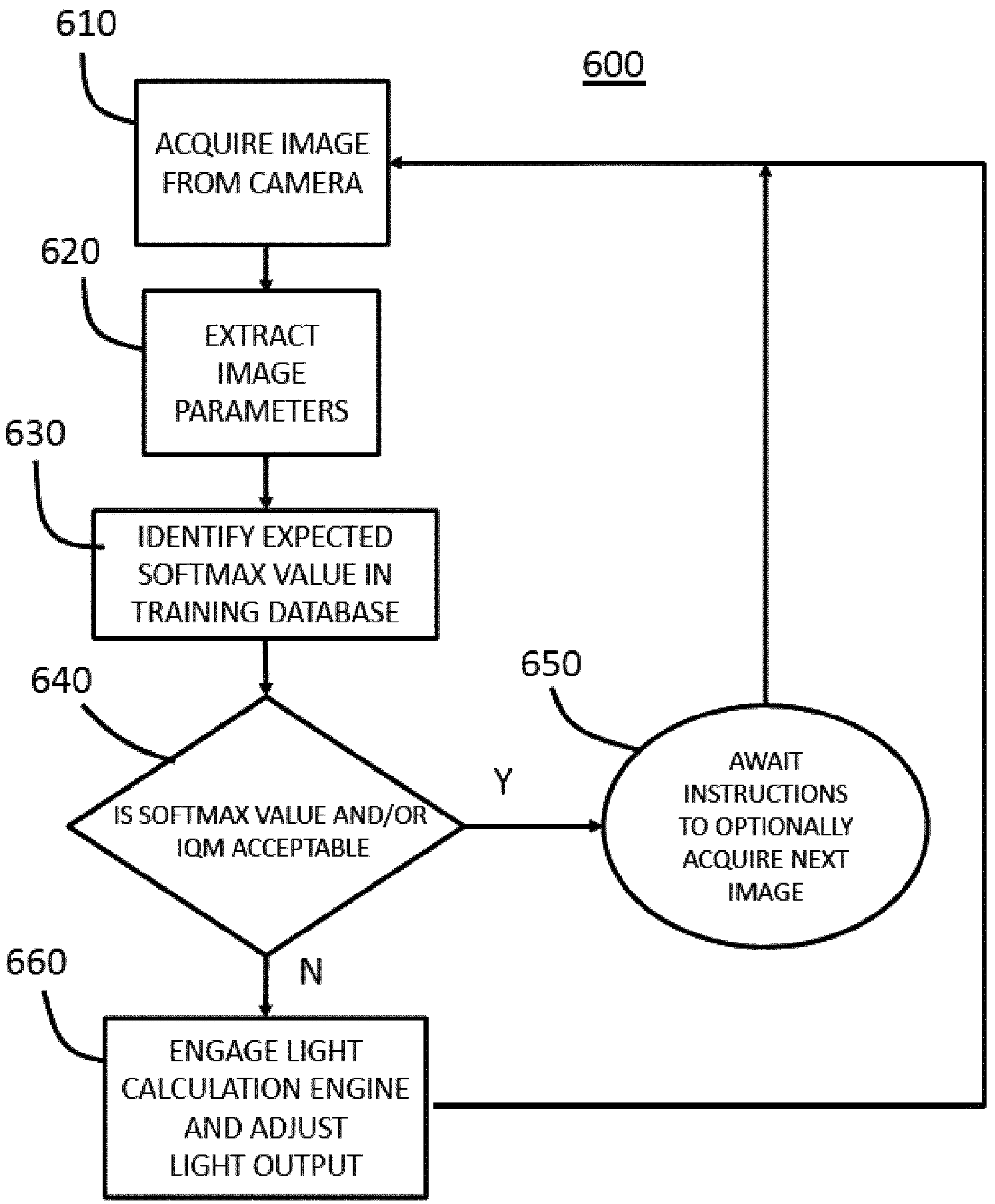
FIG. 6 is a flow chart showing operation of a lighting system according aspects of the present disclosure.

FIG. 6 is a flow chart 600 showing an example of operation of image analysis and lighting correction according to aspects of the present disclosure. At step 610, an image is acquired by an image sensor. At step 620, image parameters are extracted from the image (e.g., object position, IQMs, closest luminaire, object color). At step 630, in some instances, an expected softmax value is located in the training database based on the image parameters. At step 640, a determination is made by the system 100 regarding whether the expected softmax value or IQMs are acceptable. If the answer is YES, at step 650, the system 100 can provide an indication that image is acceptable and optionally await a next image. If the answer is NO, at step 660, the light calculation engine is engaged to adjust the light output from the luminaires. An if-then rule corresponding to the IQMs is identified the light source settings calculation module. The light output of the lighting system 60 is adjusted according to the rule, and optionally, a new image may be acquired.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The invention claimed is:

1. An object detection system, comprising:

a lighting system having one or more luminaires to illuminate an object, the lighting system configured to selectably output one or more light output settings, and the light output settings includes at least relative intensities of wavelengths of light;

at least one image sensor positioned to obtain an image of the object; and at least one processor coupled to the image sensor to receive the image of the object, the at least one processor comprising:

a monitoring engine configured to process the image using deep learning-based object detection and configured to determine if the image has an expected confidence value resulting from the processing of the image from the deep learning-based object detection that meets a predetermined threshold, the confidence value including a measure of contrast, intensity and/or uniformity of frame containing an image of the object, the confidence value being indicative of a likelihood of detection of the object depicted in the image by the deep learning-based object detection; and a light settings calculation module configured to select the light output settings of the lighting system to improve the expected confidence value to meet the predetermined threshold using a plurality of rules if the monitoring engine determines the image does not have the expected confidence value to meet the predetermined threshold, the light settings calculation module being configured to add to or amend the plurality of rules over a period of time, and the light settings calculation module having a multichannel color mixing algorithm to compute duty cycles for each color channel of each luminaire to select the relative intensities of wavelengths of light; and a training module configured to learn confidence values corresponding to selected object properties, the monitoring engine being further configured to obtain a confidence value from the training module for the image, the training module having a first data structure including confidence values for an array of properties of a plurality of objects, the confidence values in the training module including a plurality of values corresponding to different lighting conditions for each of the selected object proerties, wherein the light settings calculation module is configured to select the light output settings of the lighting system to improve the expected confidence value to meet the predetermined threshold using the plurality of rules only if the monitoring engine determines the image does not have the expected confidence value to meet the predetermined threshold.

2. The system of claim 1, wherein the array of properties includes a plurality of colors of the plurality of objects.

3. The system of claim 1, wherein the array of properties includes a plurality of colors of objects of colors uniformly sampled from CIE XYZ color space.

4. The system of claim 1, wherein the at least one image sensor is configured to obtain a live feed of images of the object, and the image of the object is an image from the live feed of images.

5. The system of claim 1, wherein the light settings calculation module includes a data structure including confidence values for object properties and light settings for a plurality of objects.

6. The system of claim 1, wherein the light output settings of the lighting system further include at least one of (i) a spectrum of light that includes one or more selected wavelengths, (ii) an aggregate light intensity, (iii) luminaire red, green, and blue outputs, (iv) luminaire correlated color temperature, and (v) multichannel color mixing.

7. The system of claim 1, wherein the light settings calculation module is configured to select the light output settings of the lighting system to improve the expected confidence value in part based on how large the confidence values of the training module are such that a larger confidence value for the object will result in a greater expectation that the object is in the image.

8. The system of claim 1, wherein the light settings calculation module is configured to select the light output settings of the lighting system to improve the expected confidence value in part based on a variance in a selected number of confidence values of the training module by determining a ratio of a highest confidence value for the object to a second-highest confidence value for the object.

9. The system of claim 1, wherein the light output settings of the lighting system further include luminaire correlated color temperature.

* * * * *